United States Patent [19]

Kelbel et al.

[11] 3,935,752

[45] Feb. 3, 1976

[54] TRANSMISSION

[75] Inventors: Donald W. Kelbel; John W. Holdeman, both of Muncie, Ind.

[73] Assignee: Borg-Warner Corporation, Chicago, Ill.

[22] Filed: Dec. 9, 1974

[21] Appl. No.: 531,015

Related U.S. Application Data

[62] Division of Ser. No. 441,679, Feb. 11, 1974.

[52] U.S. Cl................................................. 74/473 R
[51] Int. Cl.²......................................... G05G 9/12
[58] Field of Search.......... 74/335, 339, 473 R, 475, 74/476, 477

[56] References Cited
UNITED STATES PATENTS

| | | | |
|---|---|---|---|
| 2,694,943 | 11/1954 | Brumbaugh | 74/473 R |
| 3,645,145 | 2/1972 | Galas | 74/473 R |
| 3,757,598 | 9/1973 | Van Dest | 74/473 R |

Primary Examiner—Allan D. Herrmann
Attorney, Agent, or Firm—J. Schachner

[57] ABSTRACT

A transmission including a compact die cast aluminum housing having a steel support sleeve secured thereto by crimping to the housing forward wall, a countershaft assembly including a cluster gear countershaft and a flexible countershaft extension, and a shift control linkage assembly providing rotary and axial shift rail movement resulting in a desirable shift pattern.

7 Claims, 8 Drawing Figures

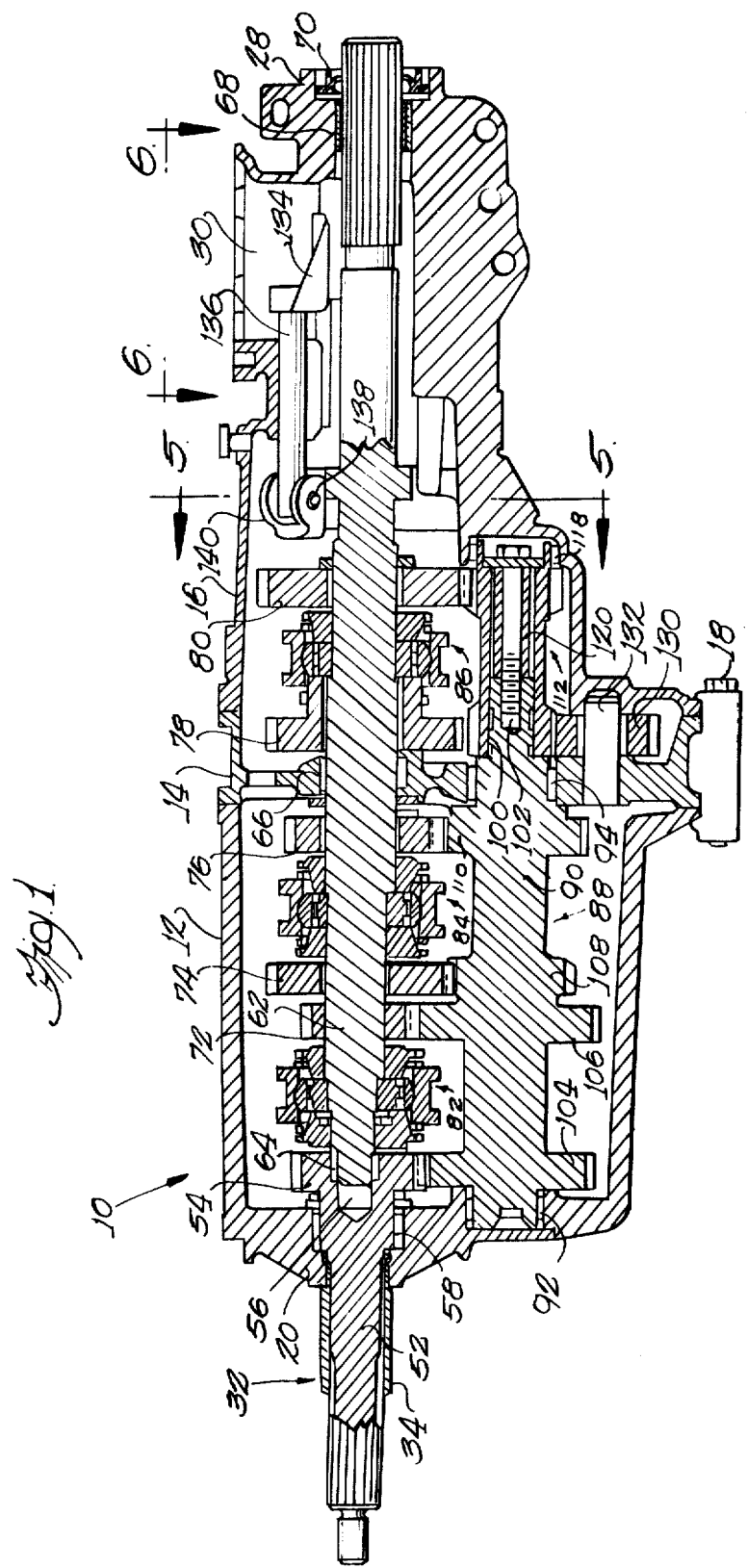

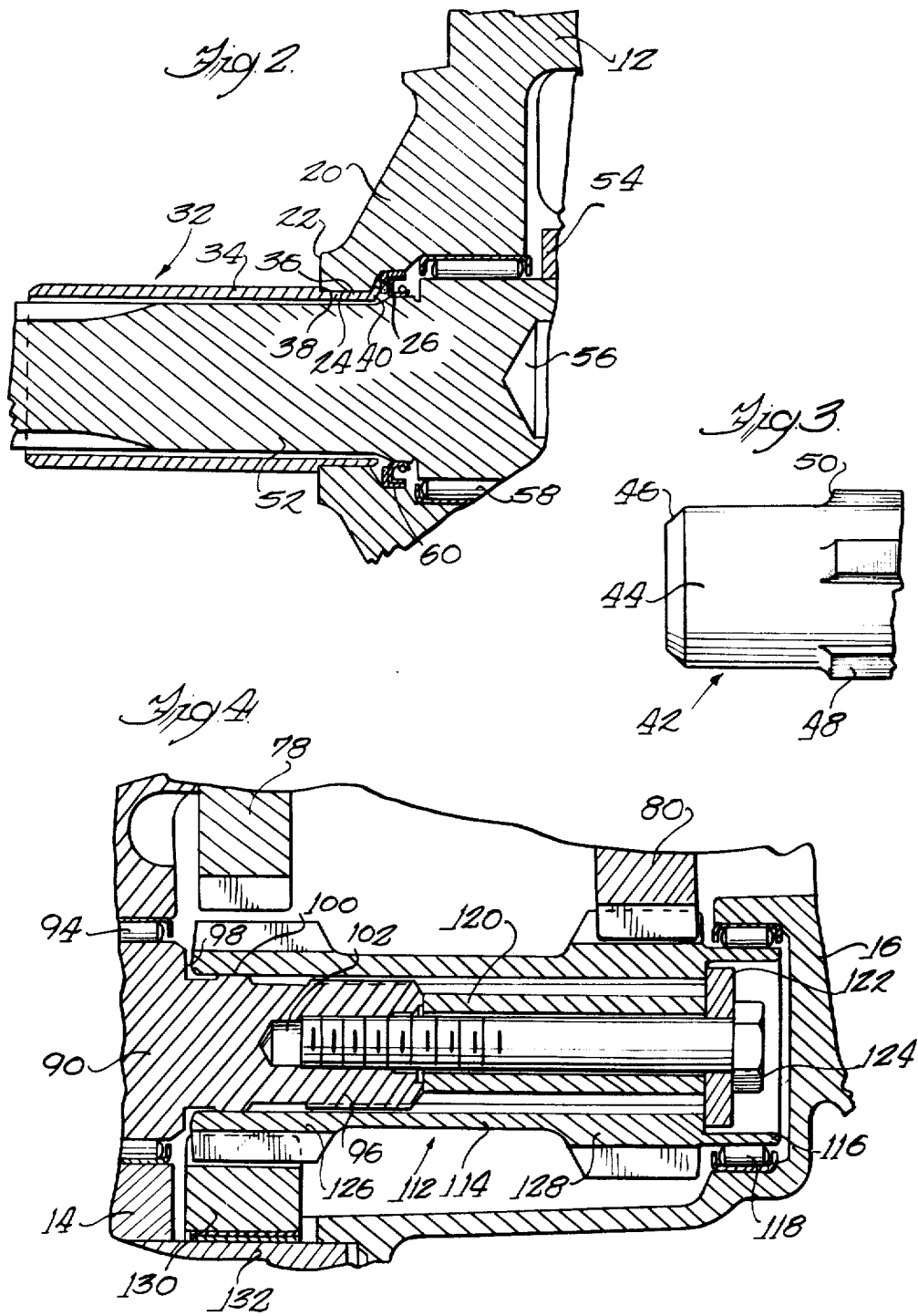

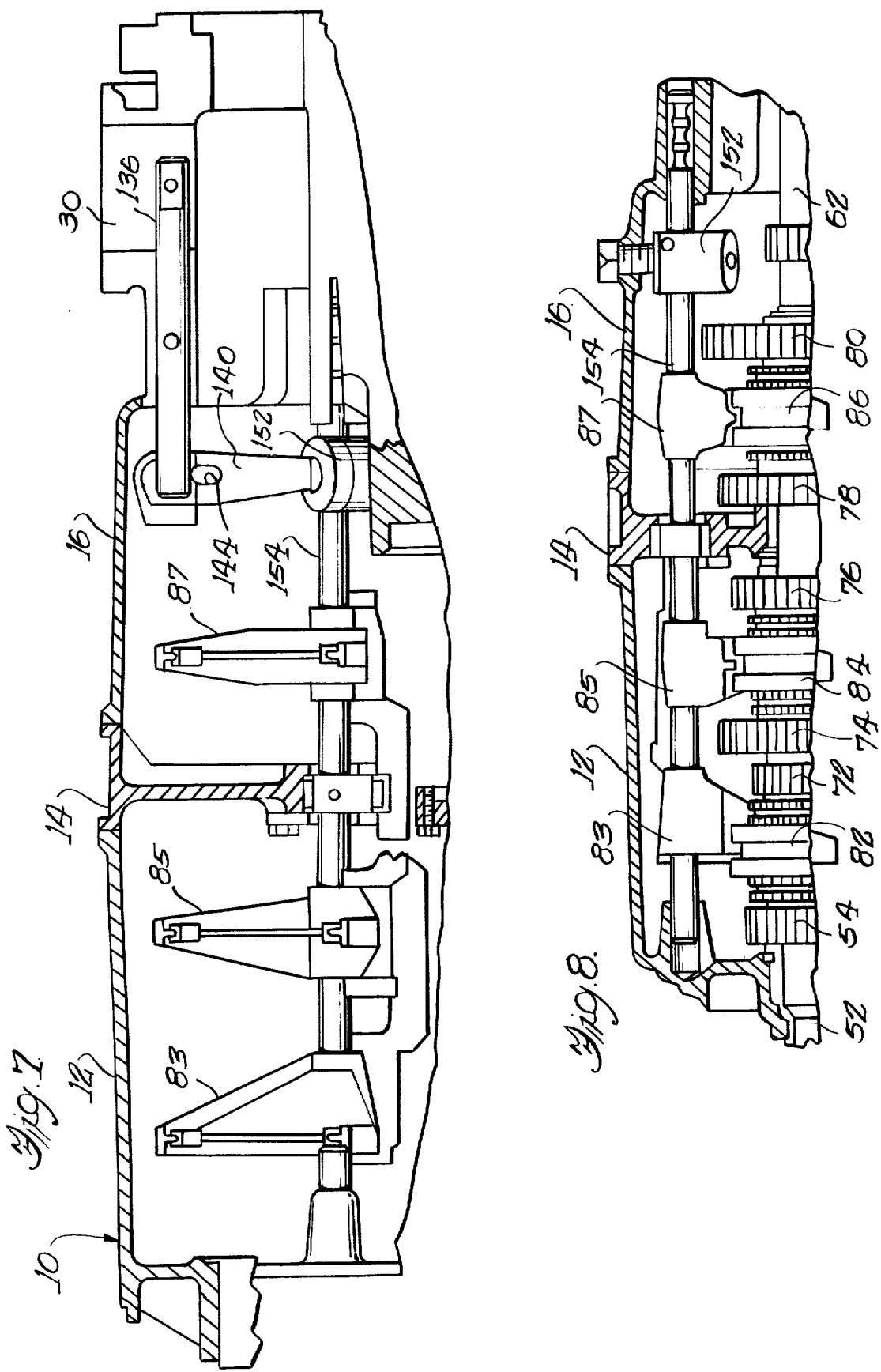

3,935,752

TRANSMISSION

This is a division of application Ser. No. 441,679 filed Feb. 11, 1974.

This invention relates generally to transmissions and in particular to a sliding gear, fully synchronized forward and reverse manual transmission including improved countershaft, shift control, and throwout bearing supoort sleeve. The invention further relates to an improved method of securing the support sleeve to the transmission housing.

In lower power-to-weight vehicles, multispeed manual transmissions are generally employed to provide the range of output torques needed for efficient vehicle operation. In a preferred form of the invention as disclosed in particular herein, a manual transmission provides five fully synchronized forward gear ratios and a reverse gear ratio. It should be understood, however, that the invention disclosed herein may be used in conjunction with other manual and automatic transmissions.

In a preferred form of the invention as fully described herein, the transmission includes an input shaft which may be coupled directly to the output shaft to provide direct drive in fourth forward ratio. The countershaft assembly is continuously driven by the input gear and may be coupled selectively with the output shaft through four separate gear sets to provide first, second, third and fifth forward ratios, with fifth being overdrive. Reverse ratio is provided by coupling the countershaft assembly through the reverse gear to the output shaft. Alternative forms of the invention may provide direct drive rather than overdrive in fifth forward ratio, or may provide three or four forward ratios, for example, with or without overdrive.

The transmission employs a sleeve supported by the housing and extending forwardly therefrom to support the cylindrical throwout bearing of an associated clutch. In the real world, this support sleeve takes a severe beating and is used for lifting the transmission as well as for alignment and support purposes. Accordingly, the sleeve herein is supported by the transmission housing in an improved way, and is joined to the housing by an improved method of assembly.

The transmission employs an improved countershaft assembly journeled in the housing in three spaced bearings. The improved countershaft assembly includes a main countershaft and a countershaft extension to provide smooth operation without requiring manufacturing tolerances which would be prohibitive.

The transmission also employs a linkage assembly which provides for axial and rotational movement of the lower shift rail in response to similar movement of the upper shift rail in opposite directions. This allows compact placement of gear sets within the transmission housing and permits a desirable shift pattern.

Accordingly, an object of the present invention is to provide a transmission including a housing and associated support sleeve secured thereto by an improved method.

Another object of this invention is to provide a transmission including a housing and associated support sleeve secured thereto so as to provide significantly greater supporting capacity than heretofore.

Another object of this invention is to provide a transmission including an improved countershaft assembly.

Another object of this invention is to provide a transmission including a countershaft assembly journaled for rotation in three spaced bearings within the transmission housing.

Another object of this invention is to provide an improved shaft and extension therefor, the combination being journaled for rotation in three bearings which need not be in perfect alignment.

Another object of this invention is to provide a transmission having improved shift control linkage allowing compact construction while producing a desirable shift pattern.

Another object of this invention is to provide a simplified five-speed transmission permitting with minimal changes either direct drive or overdrive in fifth forward ratio.

These and other objects and advantages of the invention will become apparent to those skilled in the art when reference is made to the disclosure herein, including the accompanying drawings wherein:

FIG. 1 is a cross-sectional view of a five-speed transmission embodying the invention;

FIG. 2 is an enlarged detailed view of that portion of FIG. 1 which shows the improved support sleeve secured to the transmission housing;

FIG. 3 is a detailed view of the assembly tool used for securing the sleeve to the transmission housing;

FIG. 4 is an enlarged detailed view of that portion of FIG. 1 which shows the extended portion of the countershaft;

FIG. 7 is a partial sectional view, similar to FIG. 1, partially cut away to show details of the shift rails and shift forks; and FIG. 8 is a partial sectional bottom view of the transmission of FIG. 1, partially cut away to show details of the lower shift rails, shift forks and synchronizing mechanism.

Figure 5:
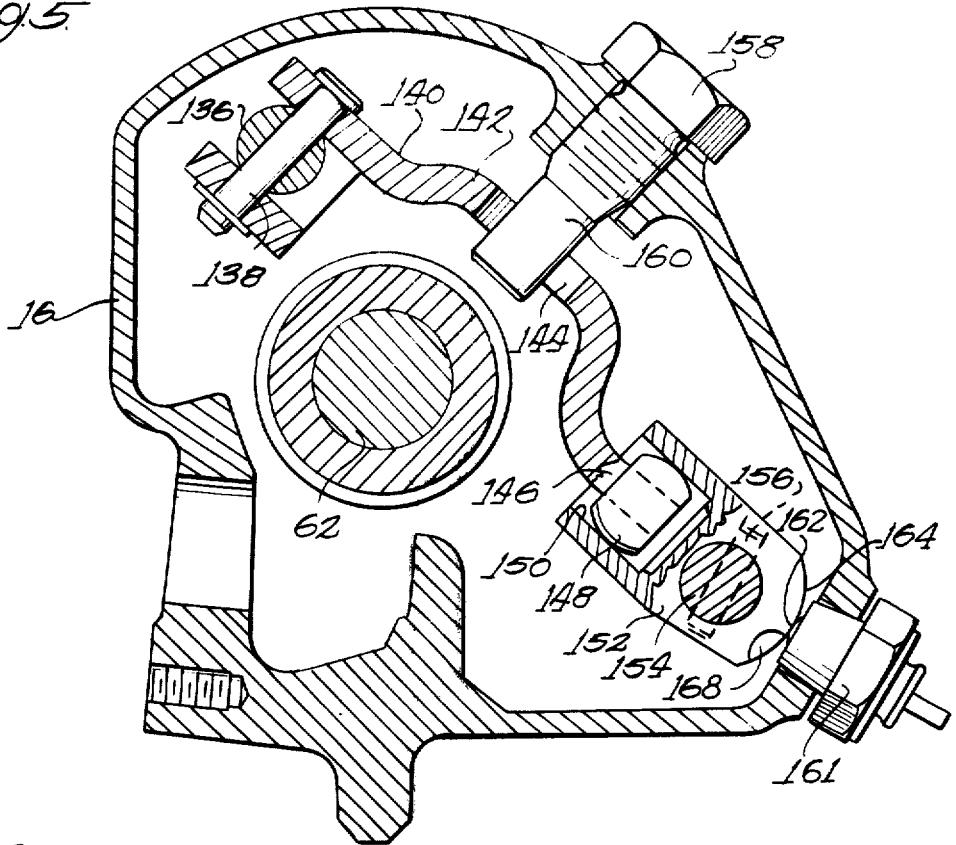
FIG. 5 is a cross-sectional view taken along the line 5—5 of FIG. 1 showing details of the rail control linkage.

Referring now to the drawings in greater detail, the five-speed transmission 10 includes a front housing section 12, an intermediate housing section 14 and a rear housing section 16. These sections are preferably die cast aluminum and are suitably secured together by a plurality of bolts 18 to form a complete housing. Front housing section 12 includes a forward wall 20 defining a front face 22, a bore 24 and a tapered interior front surface 26. Rear housing section 16 defines a rearward wall 28 and an upwardly directed tower opening 30.

A support sleeve 32 of steel includes a relatively thick wall portion 34 and a relatively thin wall portion 36 defining therebetween an abutment 38. As best shown in FIG. 2, wall portion 36 fits snugly within bore 24 and abutment 38 engages front face 22 of the housing. An end portion 40 of sleeve 32 extends beyond bore 24 into the interior of the housing and at several points is crimped against tapered interior surface 26.

As shown in FIG. 3, an assembly tool 42 is used to secure sleeve 32 to housing section 12. Assembly tool 42 includes a rod 44 having a beveled end 46. Formed on rod 44 in a preferred form of the invention are five projections 48 having arcuate end surfaces 50.

Sleeve 32 is snugly secured to the housing in the following manner. Sleeve 32 is inserted into bore 24 until abutment 38 engages front face 22. Assembly tool 42 is inserted through the rear of housing section 12 and into sleeve 32. Projections 48 engage end portion 40 and deform sections thereof outwardly, in accordance with the shape of arcuate end surfaces 50 of projections 48, into secure engagement with tapered surface 26 of forward wall 20. Thus sleeve 32 is crimped snugly into engagement with forward wall 20 and is secured by engagement of abutment 38 and five spaced areas of end portion 40 respectively with front face 22 and tapered surface 26.

Sleeve 32 provides support for the transmission during assembly, shipping, and installation in an associated vehicle. The snug fit provided by this method of assembly insures that the sleeve is capable of taking abuse during handling, and still providing an aligned mount for a clutch release bearing.

In practice it has been found that such a method of mounting sleeve 32 on housing section 12 provides surprising strength. The sleeve is capable of supporting unbalanced side loads in addition to the associated clutch release bearing and its related mechanisms. Indeed, side loads of 1,000 lbs. have been supported by such a sleeve. Thus it should be clear that in handling and assembling transmission 10 into an automotive vehicle or the like, sleeve 32 may be used in supporting and carrying transmission 10 without impairing its usefulness as a mount.

An input shaft 52 extends coaxially through sleeve 32 into transmission 10 and defines therein an input gear 54. Input shaft 52 further defines a bore 56 at its interior end. Input shaft 52 is journaled for rotation in a bearing 58 secured in forward wall 20 of housing section 12. A suitable seal 60 is provided between forward wall 20 and input shaft 52.

An output shaft 62 is journaled for rotation in bearings 64, 66 and 68, respectively secured within bore 56 of input shaft 52, intermediate wall section 14 and rearward wall 28 of housing section 16. Output shaft 62 extends through rearward wall 28, and a suitable seal 70 is provided therefor. A plurality of spaced output gears 72, 74, 76, 78 and 80 are carried by output shaft 62.

A fourth-fifth ratio synchronizing clutch mechanism 82 is located between input gear 54 and fifth ratio output gear 72. A second-third ratio synchronizing clutch mechanism 84 is located between second ratio output gear 74 and third ratio output gear 76. Similarly, a reverse-first ratio synchronizing clutch mechanism 86 is located between reverse ratio output gear 78 and first ratio output gear 80. Synchronizing clutch mechanisms 82, 84 and 86 may be of the type disclosed in White et al., U.S. Pat. No. 2,221,900 issued Nov. 19, 1940 and incorporated herein by reference.

Clutch mechanism 82 is moved forwardly to provide fourth or direct ratio, directly engaging input shaft 52 with output shaft 62, and is moved rearwardly to engage output gear 72 in fifth or overdrive ratio. Clutch mechanism 84 is moved forwardly to engage output gear 74 in second ratio and rearwardly to engage output gear 76 in third ratio. Similarly, clutch mechanism 86 is moved forwardly to engage output gear 78 in reverse ratio and rearwardly to engage output gear 80 in first ratio.

A cluster gear 88 includes a countershaft 90 journaled for rotation in bearings 92 and 94, respectively secured in housing sections 12 and 14. Countershaft 90 includes a rearwardly extending end portion 96 of reduced diameter which, together with countershaft 90, defines an abutment 98. End portion 96 defines an outwardly extending boss 100 spaced rearwardly from abutment 98, and also defines an interior threaded bore 102.

Cluster gear 88 includes a drive gear 104 meshing with input gear 54 to provide continuous drive for countershaft 90. Cluster gear 88 also includes a fifth ratio input gear 106, a second ratio input gear 108, and a third ratio input gear 110. These input gears mesh with fifth ratio output gear 72, second ratio output gear 74 and third ratio output gear 76, respectively.

As best shown in FIG. 4, a countershaft extension 112 includes a sleeve 114 splined to end portion 96 for rotation with countershaft 90. Sleeve 114 includes an end portion 116 journaled in a bearing 118 secured within housing section 16. Countershaft extension 112 also includes a tubular spacer 120, a thrust washer 122 and a bolt 124. Bolt 124 is threaded into bore 102 until spacer 120 is tightly engaged between end portion 96 and thrust washer 122. In this position the relationship of sleeve 114 and spacer 120 is such that sleeve 114 is slidable axially relative to countershaft 90 between limit stops defined by abutment 98 and thrust washer 122. In a preferred form of the invention a clearance of approximately 0.005 inch is established.

Boss 100 serves as a guide on which sleeve 114 is slidable relative to countershaft 90. It should be clear that the splined relationship of sleeve 114 and end portion 96 allows sleeve 114 to slide axially with boss 100 as a guide between limit stops represented by abutment 98 and thrust washer 122.

Sleeve 114 defines gears 126 and 128. Reverse input gear 126 drives reverse output gear 78 through an intermediate gear 130 carried by a reverse countershaft 132, which in turn is supported by housing sections 14 and 16. First ratio input gear 128 meshes with first ratio output gear 80 to provide first ratio.

In the optimum condition, bearings 92, 94 and 118 will be in true axial alignment. However, given normal manufacturing tolerances, these bearings may be slightly out of true alignment. In orde to compensate for slight misalignment and still provide for a compact gearing arrangement within a transmission housing shorter than would otherwise be required, countershaft 90 is supported at two points, namely, bearings 92 and 94. These two points establish an axially aligned relationship. Any axial misalignment may be represented relatively by the position of bearing 118 vis-a-vis bearings 92 and 94. Our invention provides countershaft extension 112 to compensate for such misalignment. Specifically, sleeve 114 is pivotal transversely about a point on boss 100. In practice, it has been found that the freedom of sleeve 114 to shift axially and the splined driving relationship of sleeve 114 and end portion 96 allow an adequate range of transverse pivotal movement about boss 100. This is true even though the spline tends to force concentricity under load.

Figure 6:
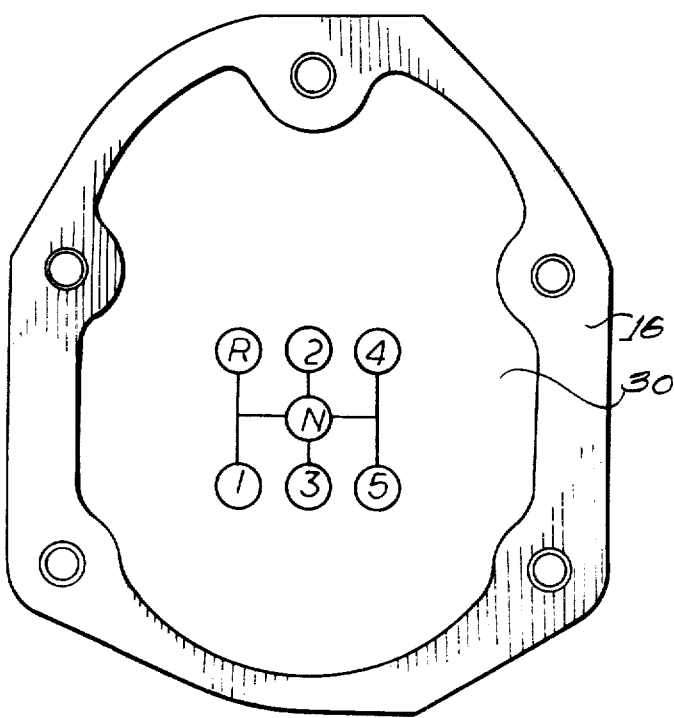
FIG. 6 is a top view taken along the line 6—6 of FIG. 1 showing in diagrammatic form the shift pattern which is an important feature of the improved transmission herein.

As will be apparent from FIG. 6, the improved transmission provides a very desirable, convenient shift pattern. This pattern includes a leftward reverse-first position, a central second-third position and rightward fourth-fifth position as viewed from above.

In achieve this pattern, it was necessary to arrange the various gear sets as shown herein. The pattern is accomplished by providing that clutch mechanism 82 move forwardly to establish fourth ratio and rearwardly to establish fifth ratio, that clutch mechanism 84 move forwardly to establish second ratio and rearwardly to establish third ratio and clutch mechanism 86 move forwardly to establish reverse ratio and rearwardly to establish first ratio.

In addition, to achieve the pattern shown in FIG. 6 within a very compact transmission housing, it was necessary to provide upper and lower shift rails which move in opposite directions. A bell crank 134 is connected to an upper shift rail 136 suitably supported in housing seciton 16 for both rotary and axial motion. Upper shift rail 136 is loosely connected by means of an appropriate pin 138 with a lever 140. Lever 140 has an offset central portion 142 of bifurcated configuration, thereby defining a slot 144. The lower portion 146 of lever 140 supports a spherical ball 148, which in a preferred form may be a pair of spherical elements snapped into position on lower portion 146. Spherical ball 148 is frictionally accommodated in a socket 150 formed at one end of a link member 152. Link member 152 is secured to a lower shift rail 154 by means of a suitable pin 156.

A bolt 158 is threaded to housing section 16 and extends into the interior thereof. Bolt 158 has an extension in the form of a cylindrical stud 160 extending through slot 144 of bifurcated central portion 142. A conventional control tower is supported on housing section 16 above opening 30. A suitable gearshift stick extends into opening 30 and is engageable with bell crank 134. Appropriate movement of the stick in the pattern shown in FIG. 6 will effect the desired shifting results. For example, when the stick is moved leftward or rightward to one of the positions shown in FIG. 6, bell crank 134 will cause upper shift rail 136 to rotate. This in turn causes lever 140 to pivot about upper shift rail 136 with stud 160 serving as a guide. The ball and socket relationship 148–150 causes link member 152 to pivot, thereby rotating lower shift rail 154 in a direction opposite to that of upper shift rail 136. It should be understood that lower shift rail 154 carries appropriate fingers which engage shift forks to selectively engage synchronizing clutch mechanisms 82, 84 and 86.

Forward or rearward movement of the stick will cause responsive axial movement of upper shift rail 136. As upper shift rail 136 moves axially, stud 160 of bolt 158 acts as a fulcrum about which lever 140 pivots. The result is that forward axial movement of upper shift rail 136 will cause rearward axial movement of lower shift rail 154. Similarly, rearward axial movement of upper shift rail 136 will cause forward axial movement of lower shift rail 154. By this means, engagement of appropriate shift forks selectively with synchronizing clutch mechanisms 82, 84 and 86 allows the shift pattern shown within a compact transmission housing.

Thus, rotation of upper shift rail 136 causes an appropriate rotation of lower shift rail 154, thereby selectively engaging one of shift forks 83, 85 and 87. The shift forks are engaged in a conventional manner with synchronizing clutch mechanisms 82, 84 and 86, respectively. Subsequent longitudinal movement of upper shift rail 136 causes an opposite movement of lower shift rail 154. As a result, the selectively engaged shift fork moves its associated synchronizing clutch mechanisms to establish the desired gear ratio.

A switch 161 is supported by housing section 16 with a contact 162 extending into the interior thereof. Link member 152 defines a suitable cam surface 164 having an appropriate detent 168 defined therein so as to actuate switch 161 as required.

The relative effective lengths of lever 140 and link member 152 determine the mechanical advantage obtained in effecting rotary movement of lower shift rail 154. Similarly, the position of bolt 158 determines the fulcrum point for lever 140 and thus its mechanical advantage in effecting axial movement of lower shift rail 154.

In a preferred form of the invention, first gear provides a reduction of 3.41, second gear a reduction of 2.08, third gear a reduction of 1.40, fourth gear direct drive and fifth gear overdrive with a ratio of 0.80. The reduction in reverse gear is 3.36. It should be understood, however, that various other ratios may be provided as desired. For example, with minimal changes fourth gear may provide a suitable reduction and fifth gear may provide direct drive.

It should be apparent that although the invention provides a novel arrangement for a five-speed sliding gear transmission, it is readily convertible for use with three or four speed or other sliding gear transmission assemblies with or without overdrive. Further, it should be understood that while a preferred embodiment of the invention has been shown and described, this should be considered as illustrative and may be modified by those skilled in the art without departing from the scope thereof which is to be limited only by the claims herein.

What is claimed is:

1. In a transmission, a housing, input and output shafts respectively journalled in said housing, said input shaft defining an input gear, at least one ratio output gear rotatably supported on said output shaft, a cluster gear assembly journalled in said housing and defining a drive gear meshing wiht said input gear and at least one ratio input gear in meshing relationship with said ratio output gear, means supported by said output shaft and axially movable for clutching said ratio output gear to said output shaft, first and second shift rails supported in said housing for rotational and axial movement, said clutching means being engageable by said second shift rail upon rotational movement thereof and being axially movable thereby upon axial movement thereof for said clutching, linkage means connecting said shaft rails for effecting movement of said second shift rail in response to movement of said first shift rail.

2. The invention according to claim 1, said linkage means including first and second links respectively connected to and movable with said first and second shift rails, said second link being frictionally engaged by said first link for rotational movement therewith, whereby rotational movement of said first shift rail in one direction causes rotational movement of said second shift rail in the opposite direction.

3. The invention according to claim 2, said first link defining a ball, said second link defining a socket, said ball and socket forming said frictional engagement.

4. The invention according to claim 1, said linkage means including first and second links respectively connected to and movable with said first and second shift rails, said second link engaged by said first link for axial movement therewith, a fulcrum supported by said housing and engageable by said first link between said first shift rail and said second link, whereby axial movement of said first shift rail in one direction causes axial movement of said second shift rail in the opposite direction.

5. The invention according to claim 1, said linkage means including first and second links respectively connected to said first and second shift rails for rotational and axial movement therewith, said links being frictionally engaged for rotational movement in opposite directions, and a fulcrum supported in said housing about which said first link is pivotable upon axial movement of said first shift rail, whereby said shift rails are axially movable in opposite directions.

6. In combination, a housing, first and second spaced rails supported in said housing for rotational and axial movement, first and second link members, a pivot pin securing said first link member to said first rail for movement therewith, said second link member secured to said second rail for movement therewith, said first and second link members respectively defining a ball and socket forming a friction connection, and a fulcrum supported in said housing and engageable by said first link member between said pivot pin and ball upon axial movement of said first link member, whereby rotational movement of said first rail and first link member is transmitted through said friction connection resulting in opposite rotational movement of said second link member and second rail, and whereby axial movement of said first rail causes pivotal movement of said first link member about said fulcrum resulting in opposite axial movement of said second link member and second rail.

7. The invention according to claim 6, said first link member defining a slot therethrough, said fulcrum extending through said slot, said first link member being slidable along said fulcrum during rotational movement of said first rail and being pivotal about said fulcrum during axial movement of said first rail.

* * * * *